(12) United States Patent
Leng et al.

(10) Patent No.: US 10,225,514 B2
(45) Date of Patent: Mar. 5, 2019

(54) VIDEO PLAYER, A DISPLAY APPARATUS, A VIDEO PLAYING SYSTEM AND A VIDEO PLAYING METHOD

(71) Applicant: BOE TECHNOLOGY GROUP CO., LTD., Beijing (CN)

(72) Inventors: Changlin Leng, Beijing (CN); Jianmin He, Beijing (CN); Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 15/105,557

(22) PCT Filed: Oct. 14, 2015

(86) PCT No.: PCT/CN2015/091919
§ 371 (c)(1),
(2) Date: Jun. 16, 2016

(87) PCT Pub. No.: WO2016/176963
PCT Pub. Date: Nov. 10, 2016

(65) Prior Publication Data
US 2017/0127013 A1    May 4, 2017

(30) Foreign Application Priority Data
May 6, 2015 (CN) .......................... 2015 1 0226622

(51) Int. Cl.
*H04N 7/015* (2006.01)
*G11B 27/034* (2006.01)
(Continued)

(52) U.S. Cl.
CPC .......... *H04N 7/015* (2013.01); *G09G 3/2092* (2013.01); *G09G 5/12* (2013.01); *G11B 27/034* (2013.01);
(Continued)

(58) Field of Classification Search
CPC ........ G11B 27/34; G09G 3/2092; G09G 5/12; H04N 7/015; H04N 5/775; H04N 5/92
See application file for complete search history.

(56) References Cited

U.S. PATENT DOCUMENTS 6,429,833 B1 * 8/2002 Ryeom ................ G09G 3/2037
345/60
8,773,479 B2 * 7/2014 Nishimori ............. G09G 3/003
345/690
(Continued)

FOREIGN PATENT DOCUMENTS

CN    1622640 A    6/2005
CN    101006467 A    7/2007
(Continued)

OTHER PUBLICATIONS

First Chinese Office Action, for Chinese Patent Application No. 201510226622.0, dated Jun. 14, 2017, 19 pages.
(Continued)

*Primary Examiner* — Mishawn N Hunter
(74) *Attorney, Agent, or Firm* — Kinney & Lange, P.A.

(57) ABSTRACT

A video player is provided, comprising: a video playing unit, configured to convert an image inputted to the video playing unit into a driving signal for driving a display panel; and an image preprocessing unit, configured to receive the inputted image from a display source, to preprocess the inputted image into n preprocessed images, and to output the n preprocessed images to the video playing unit, wherein the video playing unit is further configured to convert the n preprocessed images into n sets of first driving signals, and to output the n sets of first driving signals via the n output terminals of the video playing unit for displaying, wherein the n preprocessed images correspond to the n output terminals of the video playing unit with each other in a preset manner. Furthermore, a display apparatus and a video
(Continued)

playing system and a video playing method are also provided. The video player can display high resolution images at a low cost.

16 Claims, 4 Drawing Sheets

(51) Int. Cl.

| | | |
|---|---|---|
| *G11B 27/34* | (2006.01) | |
| *H04N 5/775* | (2006.01) | |
| *H04N 5/92* | (2006.01) | |
| *G09G 3/20* | (2006.01) | |
| *G09G 5/12* | (2006.01) | |
| *H04N 5/76* | (2006.01) | |

(52) U.S. Cl.
CPC ............ *G11B 27/34* (2013.01); *H04N 5/775* (2013.01); *H04N 5/92* (2013.01); *G06T 2207/20021* (2013.01); *G09G 2300/026* (2013.01); *G09G 2340/0435* (2013.01); *H04N 5/76* (2013.01)

(56) References Cited

U.S. PATENT DOCUMENTS

| | | |
|---|---|---|
| 2007/0070423 A1 | 3/2007 | Kakutani |
| 2008/0074704 A1* | 3/2008 | Ebisawa ............ H01L 27/14618 358/302 |
| 2008/0186317 A1 | 8/2008 | Minamihama |
| 2008/0186917 A1 | 8/2008 | Wu et al. |
| 2011/0032422 A1 | 2/2011 | Yamamoto et al. |
| 2013/0069993 A1 | 3/2013 | Nishimori et al. |
| 2014/0362295 A1* | 12/2014 | Suzuki ................... G09G 5/003 348/564 |
| 2015/0002739 A1 | 1/2015 | Rui |
| 2015/0281692 A1* | 10/2015 | Urata ..................... H04N 19/33 382/239 |

FOREIGN PATENT DOCUMENTS

| | | |
|---|---|---|
| CN | 101236658 A | 8/2008 |
| CN | 101282478 A | 10/2008 |
| CN | 101682739 A | 3/2010 |
| CN | 102281469 A | 12/2011 |
| CN | 103207879 A | 7/2013 |
| CN | 103347163 A | 10/2013 |
| CN | 103455984 A | 12/2013 |
| CN | 103595896 A | 2/2014 |
| CN | 103985082 A | 8/2014 |
| CN | 104836974 A | 8/2015 |
| JP | 2008191586 A | 8/2008 |
| JP | 2009070387 A | 4/2009 |

OTHER PUBLICATIONS

International Search Report and Written Opinion from PCT Application Serial No. PCT/CN2015/091919, dated Feb. 4, 2016, 12 pages.
Third Chinese Office Action, for Chinese Patent Application No. 201510226622.0, dated Jul. 12, 2018.
Fourth Chinese Office Action, for Chinese Patent Application No. 201510226622.0, dated Dec. 5, 2018.
Extended European Search Report dated Dec. 17, 2018, for corresponding European Application No. 15866395.5.

* cited by examiner

VIDEO PLAYER, A DISPLAY APPARATUS, A VIDEO PLAYING SYSTEM AND A VIDEO PLAYING METHOD

CROSS-REFERENCE TO RELATED APPLICATION(S)

This application claims priority to Chinese Application No. 201510226622.0, filed on 6 May 2015, the contents of which are incorporated herein by reference in its entirety.

TECHNICAL FIELD

The application relates to a field of playing videos, in particular, relates to a video player, a display apparatus, a video playing system including the video player and the display apparatus, and a video playing method.

BACKGROUND

A display technology with 8K4K (i.e. an image with a resolution of 7680×4320) has been developed. Conventional 8K4K display technology converts an 8K4K source into a corresponding electric signal by using a specific 8K4K player, and transfers the corresponding electric signal to an 8K4K display panel after being processed by a specific signal processing circuit.

However, the specific 8K4K player has a complex structure and a high cost, which causes it hardly to be popularized in a market.

Thus, the present application is intended to reduce the costs of the 8K4K sources.

SUMMARY

The present application provides a video player, a display apparatus, a video playing system including the video player and the display apparatus, and a video playing method, which can play the 8K4K display source. The video player according to the present application has a low cost, allowing to play the 8K4K sources with a low cost.

According to one aspect of the application, a video player is provided, which may comprise: a video playing unit, configured to convert an image inputted to the video playing unit into a driving signal for driving a display panel; and a video playing unit, configured to convert an image inputted to the video playing unit into a driving signal for driving a display panel; and wherein the video playing unit is further configured to convert the n preprocessed images into n sets of first driving signals, and to output the n sets of first driving signals via the n output terminals of the video playing unit for playing, wherein n is an integer greater than 1, and the n preprocessed images correspond to the n output terminals of the video playing unit with each other in a preset manner.

Optionally, the image preprocessing unit may comprise an image dividing unit configured to divide the image inputted to the video playing unit into n sub images; and a sub image labeling unit configured to label the n sub images in a preset rule so as to obtain the n preprocessed images with image labels.

Optionally, the sub image labeling unit may be configured to convert grey scale levels of A pixels on a first row of each sub image into a preset grey scale level value to form an image label, and the preset grey scale values corresponding to A pixels of different sub images are different, wherein A is an integer greater than 1.

Optionally, the image label is formed by converting first A pixels of each sub image, wherein A is 8 and n is 4,
a code for the grey scale level value for the image label of a first preprocessed image is 10100001;
a code for the grey scale level value for the image label of a second preprocessed image is 10100010;
a code for the grey scale level value for the image label of a third preprocessed image is 10100011; and
a code for the grey scale level value for the image label of a fourth preprocessed image is 10100100.

Optionally, a resolution of the inputted image is M×N, wherein M and N are both positive evens, and the image dividing unit may comprise a row determining sub unit, a column determining sub unit and a sub image storage sub unit,
the row determining sub unit is further configured to compare a row number i of the inputted pixel (i, j) with M/2, and the column determining sub unit is further configured to compare the column number j of the inputted pixel (i, j) with N/2, and the row determining sub unit and the column determining sub unit transfer results of the comparing to the sub image storage sub unit, respectively;
the sub image storage sub unit is configured to store pixels within $1<j \leq N/2$ and $1<i \leq M/2$ into a first sub image; store pixels within $1<j \leq N/2$ and $i>M/2$ into a second sub image, store pixels within $j>N/2$ and $1<i \leq M/2$ into a third sub image, and store pixels within $j>N/2$ and $i>M/2$ into a fourth sub image.

Optionally, M is 7680 and N is 4320.

According to another aspect of the application, a display apparatus is provided, which may comprise a display panel including n input terminals, the display panel being divided into n parts corresponding to the n input terminals respectively, the display apparatus further comprises an image post-processing unit having n input terminals and n output terminals, wherein the n input terminals of the image post-processing unit are connected ton output terminals of the video player according to the present application respectively, the n output terminals of image post-processing unit are connected to the n input terminals of the display panel respectively; wherein the image post-processing unit is configured to convert the n sets of first driving signals corresponding to the n preprocessed images into n sets of second driving signals, and output the n sets of second driving signals into the n input terminals of the display panel respectively in a synchronous manner such that the display panel displays an image being consistent with the inputted image.

Optionally, each of the preprocessed images may contain an image label, and the image post-processing unit may further comprise n frame selecting units and n label removing units,
wherein input terminals of the n frame selecting units are configured to be used as the n input terminals of the display apparatus, output terminals of the n frame selecting units are connected to input terminals of the n label removing units respectively, output terminals of the n label removing units are connected to the n output terminals of the image post-processing unit respectively, wherein any of the n frame selecting units is capable of selecting a first driving signal corresponding to the output terminal of the image post-processing unit which is connected to the frame selecting unit among the n output terminals, according to the image label,
the label removing unit is configured to remove a signal corresponding to the image label from the received first driving signal so as to obtain a second driving signal, wherein the label removing unit is further configured to output the second driving signal to the output terminal of the image post-processing unit which is connected with the label removing unit among the n output terminals.

Optionally, the preprocessed images may be formed by dividing the inputted image into n sub images and then converting the grey scale levels of A pixels of on a first row of each sub image into a preset grey scale level value, wherein the image label is formed by the A pixels having a preset grey scale level; the label removing unit is further configured to restore a signal corresponding to the image label in each of the n sets of first driving signals to a signal corresponding to the A pixels on a corresponding sub image, so as to obtain a second driving signal corresponding to the corresponding sub image.

Optionally, the image post-processing unit may further comprise n storage units and n frame duplicating units, input terminals of the n fame duplicating units and output terminals of the n label removing units connecting to each other respectively, and output terminals of the n fame duplicating units being used as the n output terminals of the image post-processing unit, wherein each frame duplicating unit is configured to duplicate B copies of the second driving signal inputted into a corresponding frame duplicating unit, each frame duplicating unit corresponding to one of the storage units which is used to store the second driving signal outputted from the corresponding frame duplicating unit temporarily.

Optionally, the storage units may be DDR3 storage units.

Optionally, a frequency of the inputted image may be 15 Hz, and B is 4.

Optionally, the output terminals of the image post-processing unit may be V-by-One ports.

According to another aspect of the application, a video playing system is provided, which may comprise the video player according to the application and the display apparatus according to the application.

According to yet another aspect of the application, a video playing method is provided, which may comprising steps of:
converting an inputted image into n preprocessed images with image labels;
converting the n preprocessed images into n sets of first driving signals;
restoring the n sets of first driving signals to the n sets of second driving signals corresponding to the n sub images respectively; and
outputting the n sets of second driving signals into n input terminals of a display panel respectively, in a synchronous manner.

Optionally, the step of converting an inputted image into n preprocessed images with image labels may further comprise: dividing the inputted image into the n sub images; and adding the image labels to the n sub images, to obtain the n preprocessed images.

Optionally, the step of adding the image labels to the n sub images may comprise:
converting grey scale levels of A pixels on a first row of each sub image into a preset grey scale level value and then forming an image label, to obtain the preprocessed image, wherein the preset grey scale values corresponding to first A pixels of different sub images are different, wherein A is an integer greater than 1.

Optionally, the image label may be formed by converting first A pixels of each sub image, wherein A is 8 and n is 4, wherein:

a code for the grey scale level value for the image label of a first preprocessed image is 10100001;
a code for the grey scale level value for the image label of a second preprocessed image is 10100010;
a code for the grey scale level value for the image label of a third preprocessed image is 10100011; and
a code for the grey scale level value for the image label of a fourth preprocessed image is 10100100.

Optionally, a resolution of the inputted image may be M×N,
wherein the step of dividing the inputted image into the n sub images may further comprise:
comparing the row number i of the inputted pixel (i, j) with M/2;
comparing the column number j of the inputted pixel (i, j) with N/2;
wherein the sub-image storage sub unit may further configured to store pixels within $1<j \leq N/2$ and $1<i \leq M/2$ into a first sub image; store pixels within $1<j \leq N/2$ and $i>M/2$ into a second sub image; store pixels within $j>N/2$ and $1<i \leq M/2$ into a third sub image; and store pixels within $j>N/2$ and $i>M/2$ into a fourth sub image.

Optionally, M is 7680 and N is 4320.

Optionally, the step of outputting the n sets of second driving signals into n input terminals of a display panel respectively in a synchronous manner may comprise:
duplicating B copies of respective set of the second driving signal; and
outputting the n sets of the second driving signals each having B copies into respective input terminals of the display panel in a synchronous manner.

Optionally, a frequency of the inputted image is 15 Hz, and B is 4.

BRIEF DESCRIPTION OF THE DRAWINGS

The present disclosure will be fully understood by proving the accompanying drawings, which is a part of this description. It is noted that the drawings is intended to depict the present application with reference to the following implementations and should not be considered as a limiting of its scope, in which.

DETAILED DESCRIPTION

The principles, detailed descriptions and advantageous effects of the embodiments of present disclosure will now be described with reference to the drawings in details. It should be noted that the implementations descripted herein are only intended to illustrate the application, rather than to limit it.

Figure 1:
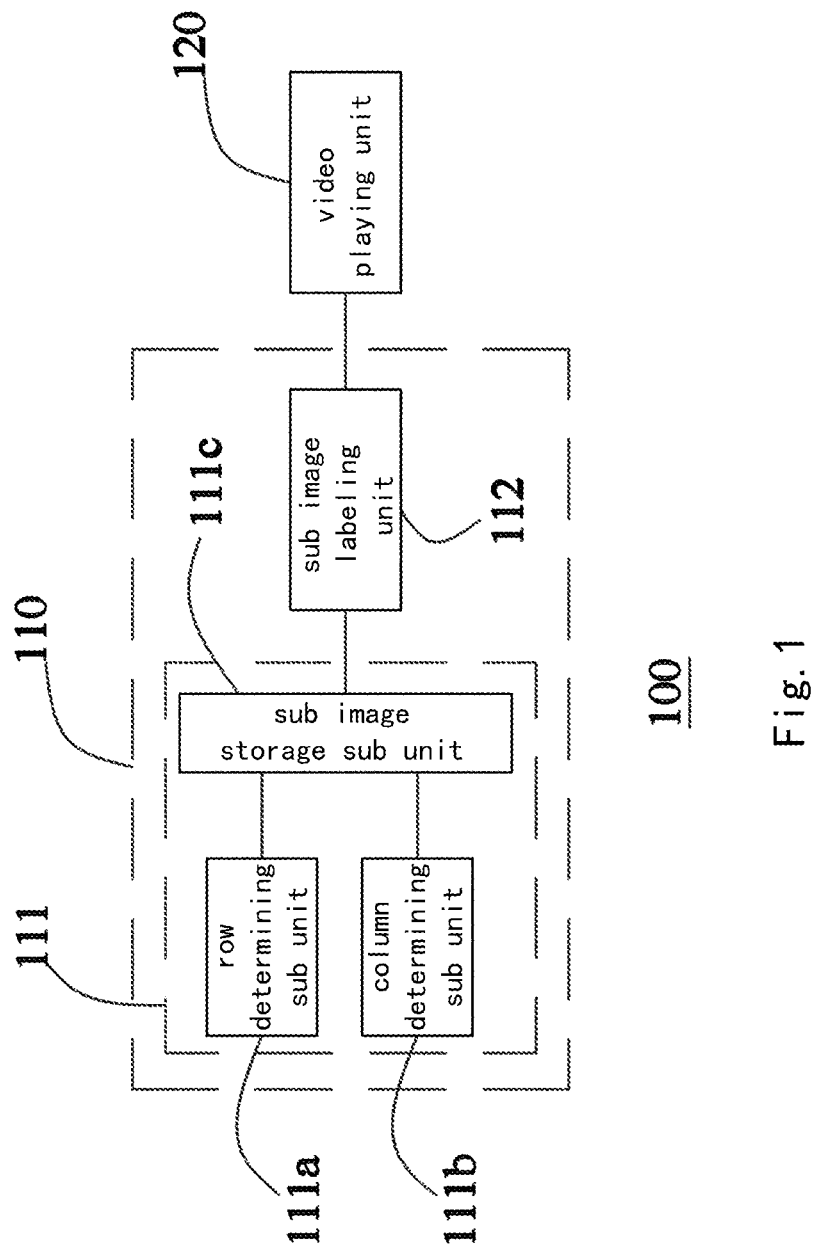
FIG. 1 is a block diagram of the video player according to one or more embodiments of the present application.

As shown in FIG. 1, a video player 100 is provided according to an embodiment of the present application. The video player 100 may comprise a video playing unit 120, configured to convert an image inputted to the video playing unit 120 into a driving signal for driving a display panel. The video player 100 may further comprise a video playing unit 110, whose input terminals are connected to a source and output terminals are connected to input terminals of the video playing unit 120. The video playing unit 110 may be configured to convert an inputted image into n preprocessed images, and output the n preprocessed images to the video playing unit 120 having n output terminals. Then the video playing unit 120 can convert the n preprocessed images into n sets of first driving signals, and output the n sets of first driving signals via its n output terminals respectively, and is an integer greater than 1, and the n preprocessed images correspond to the n output terminals of the video playing unit 120 with each other in a preset manner.

It should be noted that in the present application, since resolutions of the preprocessed images are lower than a resolution of the inputted image, and the video playing unit 120 can convert n preprocessed images into a first driving signal respectively, the video playing unit 120 can be a video playing unit for playing images with low resolutions. For example, when an image outputted from the display source is an 8K4K images, the image preprocessing unit 110 can convert the 8K4K images into four 4K2K (i.e. 3840×2160) preprocessed images. In this case, the video playing unit 120 may be a video playing unit for playing 4K2K images. It should be easily understood that the cost of the video playing unit for playing 4K2K images is obviously lower than the cost of the video playing unit for playing 8K4K images. Furthermore, the image preprocessing unit and the video playing unit can be integrated together, so as to reduce the cost of the whole video player 100 further.

As discussed above, the video playing unit 120 may have n output terminals, each of which outputs a set of first driving signals. Accordingly, a display apparatus cooperated with the video playing unit 120 may also have n input terminals, which correspond to the n output terminals of the video playing unit respectively. The display panel of the display apparatus may be divided into n areas which correspond to the n sets of first driving signals respectively.

It should be noted that in the present application, n is a constant, rather than a variable. For example, n may be a positive integer greater than 1. Thus, the numbers of the preprocessed images and sets of the first driving signals and output terminals of the video playing unit are the same.

For example, n being equal to 4 means that the inputted image is converted into 4 preprocessed images, the 4 preprocessed images are converted into 4 sets of first driving signals, and the video playing unit 120 has 4 output terminals.

In the present application, a structure of the image preprocessing unit 110 is not restricted, as long as an inputted image transferred from a display source to the video player 100 can be divided into n preprocessed images. It should be noted that the n sets of first driving signals outputted from the video playing unit are used to drive the display panel, such that the display panel can display the n preprocessed images in a proper sequence, or the display panel can display an image being consistent with the inputted image. In this case, the n output terminals of the video playing unit 120 should correspond to the n preprocessed images with each other in a preset manner. For example, the n preprocessed images can be numbered as 1', 2', . . . , n', and the n output terminals of the video playing unit 120 can be numbered as 1#, 2#, . . . , n#. The output terminal 1# is used to output a corresponding first driving signal converted from the preprocessed image1', the output terminal 2# is used to output a corresponding second driving signal converted from the preprocessed image2', and similarly, the output terminal n# is used to output another corresponding second driving signal converted from the preprocessed image n'.

In order to achieve a correspondence between the n preprocessed images and the n output terminals of the video playing unit 120, as shown in FIG. 1, the image preprocessing unit 110 may optionally comprise an image dividing unit 111 and an sub image labeling unit 112. It should be noted that input terminals of the image dividing unit 111 are configured to be used as the input terminals of the image preprocessing unit 110, and connect to the display source, and output terminals of the image dividing unit 111 are configured to connect to the sub image labeling unit 112. The image diving unit 111 is used to divide an image inputted to the image preprocessing unit into n sub images. The sub image labeling unit 112 is configured to label the n sub images in a preset rule so as to obtain the n preprocessed images with image labels. Output terminals of the sub image labeling unit 112 are connected to the input terminals of the video playing unit 120 respectively, and the video playing unit 120 may convert the n preprocessed images into n sets of first driving signals and output the driving signals in a sequence, and n is an integer greater than 1.

In an implementation, the n sub images are labeled in a preset rule so as to distinguish the n sub images from each other, i.e. to number the n sub images, causing each of the resultant n preprocessed images having a unique image label. Since each preprocessed image has its unique image label, each of the resultant n sets of first driving signals may also have a corresponding image label, and the n sets of first driving signals can be outputted from the n output terminals.

In an implementation, the preset rule is not restricted, as long as the n sub images can be labeled to obtain n corresponding preprocessed images.

As one optional implementation, the sub image labeling unit 112 may convert grey scale levels of A pixels on a first row of each sub image into a preset grey scale level value to form an image label, so as to obtain a preprocessed image. The preset grey scale values corresponding to A pixels of different sub images are different, and A is an integer greater than 1. Changing the grey scale levels of A pixels will not make any change on the grey scale levels of other pixels, and will not change the time sequence of all pixels. Thus, only changing the grey scale levels of A pixels has a simple computing process, so as to improve a computing speed and make the playing of the video more fluent. It should be noted that A is a constant. Furthermore, A can be selected according to the numbers of the preprocessed image so that image labels are different for the different preprocessed images. Hereinafter, one optional embodiment in which A is 8 is discussed.

In an implementation, locations of the A pixels consisting the corresponding image label are not restricted, as long as the A pixels are in the first row. Optionally, the image labels are formed by converting first A pixels on a first row of each sub image. In this case, while driving the display panel, respective preprocessed images can be identified properly, so as to determine an output terminal for each first driving signal converted from each of respective preprocessed images. As another implementation, A can be set to 8, and the inputted image may be divided into four sub images, i.e. n is 4.

In this case, a resolution of the inputted image is 7680× 4320, and A is 8 and n is 4, a code for the grey scale level value for the image label of a first preprocessed image is 10100001;

a code for the grey scale level value for the image label of a second preprocessed image is 10100010;

a code for the grey scale level value for the image label of a third preprocessed image is 10100011; and a code for the grey scale level value for the image label of a fourth preprocessed image is 10100100, and 1 means that the grey scale level value is 255, and 0 means that the grey scale level value is 0.

It should be understood that the "code for the grey scale level value" is only for illustrating, and should not be considered as representing the grey scale level values for respective pixels.

In the image label corresponding to the first preprocessed image, the code for the grey scale level values of the respective pixels is 10100001, which means that the grey scale level value of the first pixel is 255, the grey scale level value of the second pixel is 0, the grey scale level value of the third pixel is 255, the grey scale level values of the fourth to seventh pixels are 0, and the grey scale level value of the eighth pixel is 255.

In the image label corresponding to the second preprocessed image, the code for the grey scale level values of the respective pixels is 10100010, which means that the grey scale level value of the first pixel is 255, the grey scale level value of the second pixel is 0, the grey scale level value of the third pixel is 255, the grey scale level values of the fourth to sixth pixels are 0, the grey scale level value of the seventh pixel is 255, and the grey scale level value of the eighth pixel is 0.

In the image label corresponding to the third preprocessed image, the code for the grey scale level values of the respective pixels is 10100011, which means that the grey scale level value of the first pixel is 255, the grey scale level value of the second pixel is 0, the grey scale level value of the third pixel is 255, the grey scale level values of the fourth to sixth pixels are 0, and the grey scale level values of the seventh and eighth pixels are 255.

In the image label corresponding to the fourth preprocessed image, the code for the grey scale level values of the respective pixels is 10100100, which means that the grey scale level value of the first pixel is 255, the grey scale level value of the second pixel is 0, the grey scale level value of the third pixel is 255, the grey scale level values of the fourth and fifth pixels are 0, the grey scale level value of the sixth pixel is 255, and the grey scale level values of the seventh and eighth pixels are 0.

In an implementation, locations of the first, the second, the third and the fourth preprocessed images are not restricted. For example, if the top left sub image is considered as a first sub image, the preprocessed image corresponding to the first sub image may be considered as the first preprocessed image; if the top right sub image is considered as a second sub image, the preprocessed image corresponding to the second sub image may be considered as the second preprocessed image; if the lower left sub image is considered as a third sub image, the preprocessed image corresponding to the third sub image may be considered as the third preprocessed image; and if the lower right sub image is considered as a fourth sub image, the preprocessed image corresponding to the fourth sub image may be considered as the fourth preprocessed image.

In order to divide the inputted image as discussed above, when the resolution of the inputted image is M×N, the image dividing unit 111 may optionally comprise a row determining subunit 111a, a column determining sub unit 111b and a sub image storage sub unit 111c.

Figure 2:
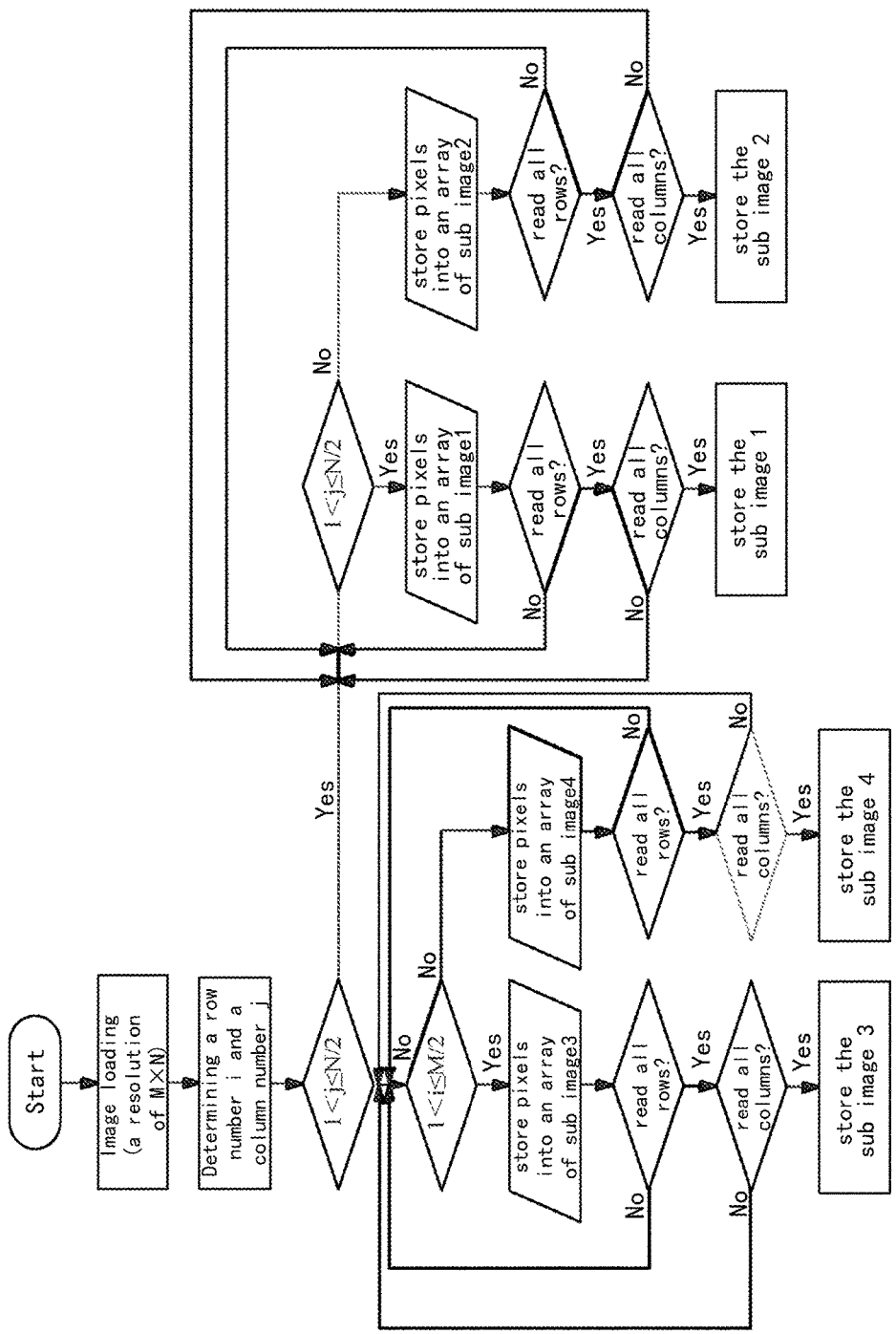
FIG. 2 is a flow chat for dividing an image.

FIG. 2 is a flow chat for numbering the sub images. As shown in FIG. 2, the row determining sub unit is configured to compare a row number i of the inputted pixel (i, j) with M/2, and the column determining sub unit is configured to compare the column number j of the inputted pixel (i, j) with N/2. After comparing, the row determining sub unit and the column determining sub unit transfer results of the comparing to the sub image storage sub unit, respectively Then, the sub image storage sub unit is configured to store pixels within $1<j \leq N/2$ and $1<i \leq M/2$ into a first sub image; store pixels within $1<j \leq N/2$ and $i>M/2$ into a second sub image, store pixels within $j>N/2$ and $1<i \leq M/2$ into a third sub image, and store pixels within $j>N/2$ and $i>M/2$ into a fourth sub image.

In particular, as shown in FIG. 2, when the inputted image is divided into four sub images (i.e. sub image1', sub image 2', sub image 3' and sub image 4' in FIG. 2), the step of dividing the inputted image may comprise steps of:

loading the inputted image with the resolution of M×N (image loading in FIG. 2); and comparing the row number i of the inputted pixel (i, j) with M/2 by the row determining sub unit and comparing the column number j of the inputted pixel (i, j) with N/2 (pixel determining in FIG. 2) by the column determining sub unit.

In particular, this may further comprise comparing the column number j of the inputted pixel (i, j) with N/2 by using the column determining sub unit.

If $1<j \leq N/2$, compare the row number i of the inputted pixel (i, j) with M/2 by using the row determining sub unit, particular:

if $1<i \leq M/2$, store the inputted pixel (i, j) into an array corresponding to the sub image 1', and then determine whether all pixels on the same row with the inputted pixel (i, j) have been read. If so, store respective pixels in the array corresponding to sub image 1' to obtain the sub image 1', otherwise continue comparing the row number i of the inputted pixel (i, j) with M/2 by using the row determining sub unit; and if $i>M/2$, store the inputted pixel (i, j) into an array corresponding to the sub image 2', and then determine whether all pixels on the same row with the inputted pixel (i, j) have been read. If so, store respective pixels in the array corresponding to sub image 2' so as to obtain the sub image 2', otherwise continue comparing the row number i of the inputted pixel (i, j) with M/2 by using the row determining sub unit.

If $j>N/2$, compare the row number i of the inputted pixel (i, j) with M/2 by using the row determining sub unit:

if $1<i \leq M/2$, store the inputted pixel (i, j) into an array corresponding to the sub image 3', and then determine whether all pixels on the same row with the inputted pixel (i, j) have been read. If so, store respective pixels in the array corresponding to sub image 3' to obtain the sub image 3', otherwise continue comparing the row number i of the inputted pixel (i, j) with M/2 by using the row determining sub unit; and if $i>M/2$, store the inputted pixel (i, j) into an array corresponding to the sub image 4', and then determine whether all pixels on the same row with the inputted pixel (i, j) have been read, and if all pixels on the same row have been read, determine whether all pixels in the same column with the inputted pixel (i, j) have been read. If so, store respective pixels in the array corresponding to sub image 4' so as to obtain the sub image 4', otherwise continue comparing the column number j of the inputted pixel (i, j) with N/2 by using the column determining sub unit. On another aspect, If all pixels on the same row have not been read, continue comparing the row number i of the inputted pixel (i, j) with M/2 by using the row determining sub unit.

Those skilled in the art would understand that i and j are variables, rather than constants. Different values for i represent pixels on different rows, and different values for j represent pixels on different columns. However, M and N are constants. The video player according to the implementation is used to play 8K4K images (i.e. images with a resolution of 7680×4320). In this case, the inputted image of the image preprocessing unit has a resolution of 7680×4320. Therefore, M is 7680, and N is 4320.

Figure 3:
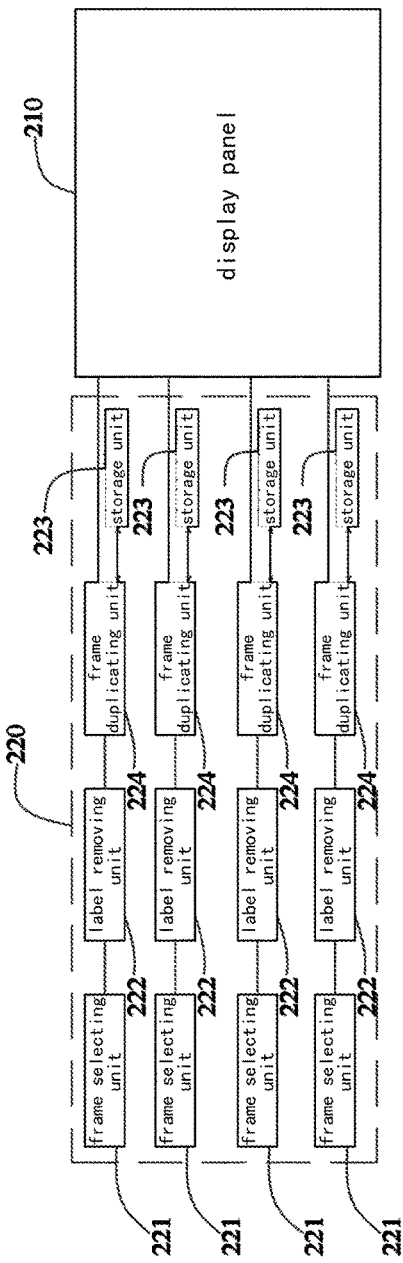
FIG. 3 is a block diagram of the display apparatus according to one or more embodiments of the present application.

According to another aspect of the implementation, a display apparatus 200 is provided. As shown in FIG. 3, the display apparatus 200 may comprise a display panel 210 including n input terminals. The display apparatus 200 may also comprise an image post-processing unit 220 having n input terminals and n output terminals. The n input terminals of the image post-processing unit 220 are connected to the n output terminals of the video player 100 according to the present implementation respectively, and the n output terminals of image post-processing unit 220 are connected to the n input terminals of the display panel 210 respectively. The image post-processing unit 220 is configured to convert the n sets of first driving signals corresponding to the n preprocessed images into n sets of second driving signals, and output the n sets of second driving signals into the n input terminals of the display panel respectively in a synchronous manner such that the display panel displays an image being consistent with the inputted image.

As discussed above, n is a constant. Furthermore, the numbers of the input terminals of the display panel is the same as the numbers of the output terminals of the video player.

As discussed above, the video player may divide the first driving signal for the inputted image into n sets of first driving signal. After being converted by the image post-processing unit 220, the n sets of first driving signal can be converted into signals adapted for driving respective areas of the display panel 210, so as to display the inputted image on the display panel 210.

In the present implementation, a structure of the image post-processing unit 220 depends on the specific form of the preprocessed images. For example, in one implementation, the preprocessed images may include the image labels. Accordingly, the image post-processing unit 220 may comprise n frame selecting units 221 and n label releasing units 222.

The input terminals of the n frame selecting units 221 are configured to be used as the n input terminals of the display apparatus 200, the output terminals of the n frame selecting units 221 are connected to input terminals of the n label removing units 222 respectively. The output terminals of the n label removing units 222 are connected to the n output terminals of the image post-processing unit respectively, and any of the n frame selecting units 221 is capable of selecting a first driving signal corresponding to the output terminal of the image post-processing unit 220 which is connected to the frame selecting unit 221 among the n output terminals, according to the image label. It should be noted that the frame selecting unit 221 may be indirectly connected to the output terminals of the image post-processing unit 220, and a labeling removing unit 222 may be provided between the frame selecting unit 221 and the image post-processing unit 220. Furthermore, output terminals of the labeling removing unit 222 may be connected to the output terminal of the image post-processing unit 220 directly or indirectly.

The label removing unit 222 may remove a signal corresponding to the image label from the received first driving signal so as to obtain a second driving signal. The label removing unit 222 is further configured to output the second driving signal to the output terminal of the image post-processing unit which is connected with the label removing unit among the n output terminals directly or indirectly.

Figure 4:
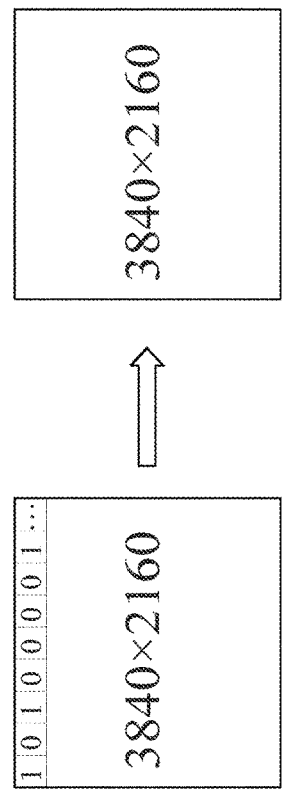
FIG. 4 is a schematic diagram for removing an image label.

FIG. 4 is a schematic diagram for removing an image label for a preprocessed image. In FIG. 4, the image on the left side is a preprocessed image. It is seen that the resolution of this preprocessed image is 3840×2160, and the image label is formed by first 8 pixels on the first row. In FIG. 4, the image on the right side is an image corresponding to the second driving signal after removing the image label, which has a resolution of 3840×2160 without the image label.

In the present implementation, the method for removing a signal corresponding to the image label from the received first driving signal is not restricted. However, removing the signal corresponding to the image label does not mean that deleting the signal corresponding to the image label from the first driving signal. On the contrary, it means that the signal corresponding to the image label is converted so as to obtain a second driving signal which can drive the display panel to display a part of the inputted image.

For facilitating understanding, "removing a signal corresponding to the image label from the received first driving signal" can be considered as an inverse operation for adding an image label.

It is appreciated that the frame selecting unit 221 is configured to output the second driving signal to the respective input terminals of the display panel 210 properly, such that the inputted image may be displayed appropriately.

In an implementation, a structure of the label removing unit 222a1 so depends on the specific form of the preprocessed images. For example, in one implementation, the preprocessed images may be formed by dividing the inputted image into n sub images and then converting the grey scale levels of A pixels of on a first row of each sub image into a preset grey scale level value, and the image label is formed by the A pixels having a preset grey scale level. The label removing unit 222 is further configured to restore a signal corresponding to the image label in each of the n sets of first driving signals to a signal corresponding to the A pixels on a corresponding sub image, so as to obtain a second driving signal corresponding to the corresponding sub image.

In the present implementation, a frequency of images corresponding to the second driving signals outputted to the display panel 210 should not be smaller than 60 Hz, so as to ensure a continuity of the display panel 210. In order to reduce the cost, the inputted image can be transferred into the video player 100 at a low frequency. However, in order to display images on the display panel 210 at a high frequency, the image post-processing unit 210 may optionally comprise n storage units 223 and n frame duplicating units 224, and input terminals of the n fame duplicating units 224 and output terminals of the n label removing units 222 are connected to each other respectively, and output terminals of the n fame duplicating units 224 are used as the n output terminals of the image post-processing unit 220. Each of the frame duplicating units 224 is configured to duplicate B copies of the second driving signal inputted into a corresponding frame duplicating unit 224, each frame duplicating unit 224 corresponding to one of the storage units 223 which is used to store the second driving signal outputted from the corresponding frame duplicating unit 224 temporarily.

If the frequency of the inputted image is a, then the frequency of the image displayed by the display panel 210 is a×B, so as to achieve a low input frequency and a high output frequency. This can also improve the fluency for video playing while reducing the power consumption. Similarly, a and B are both constants.

In the present implementation, structures of the storage units 223 are not restricted. As one optional embodiment, the storage units 223 may be DDR3 storage units for example.

Generally, the frequency of the image displayed by the display panel should not be smaller than 60 Hz, so as to obtain a fluent playing effect. If the inputted image is divided into four sub images, the frequency of the inputted images may be only 15 Hz. In this case, B is 4.

In the present implementation, the output terminals of the image post-processing unit 22 are not restricted. For example, the output terminals of the image post-processing unit 22 may be LVDS ports or V-by-One ports. Optionally, the output terminals of the image post-processing unit are V-by-One ports, so as to obtain a higher transmission speed.

The display panel may be divided into n parts, each of which corresponds to an input terminal of the display panel. Furthermore, the n parts of the display panel may be controlled independently, and each of the n parts corresponds to an individual timing controller.

Figure 6:
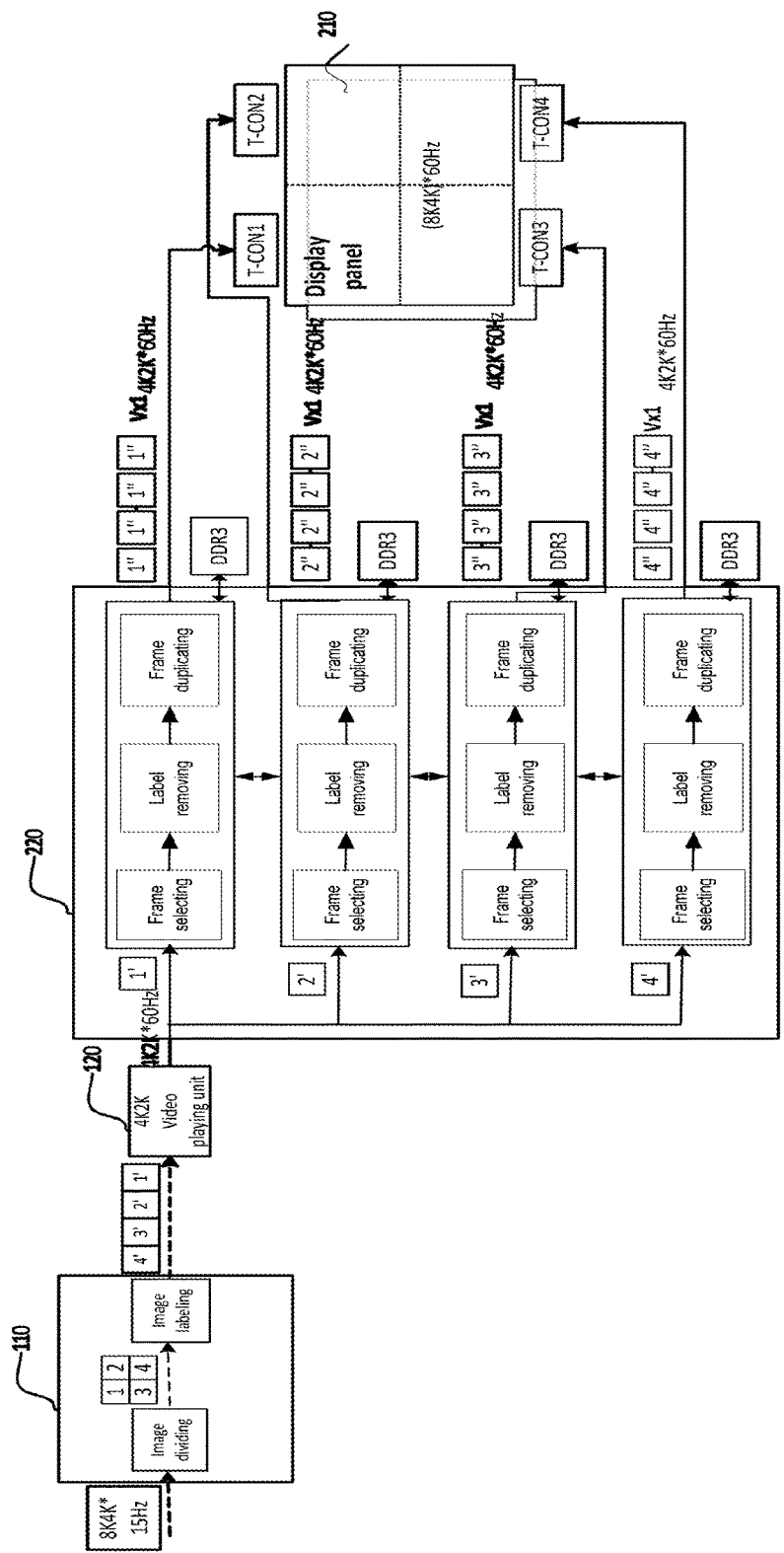
FIG. 6 is a flow char for the video playing method according to one or more embodiments of the present application.

As shown in FIG. 6, when the display panel 210 is divided into 4 parts, and each part corresponds to an individual timing controller. The part on the top left has a timing controllerT-CON1, the part on the top right has a timing controllerT-CON2, the part on the lower left has a timing controllerT-CON3 and the part on the lower right has a timing controller T-CON4.

In the present implementation, a structure of the display panel 210 is not restricted. For example, the display panel 210 may be a liquid crystal display panel, or an OLED display panel.

Figure 5:
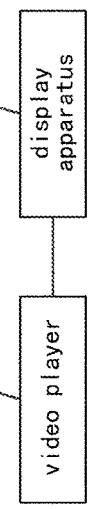
FIG. 5 is a block diagram of the video playing system according to one or more embodiments of the present application.

In another aspect of the present disclosure, a video playing system comprising a video player 100 and a display apparatus 200 is provided, as illustrated in FIG. 5. The video player 100 may be the video player according to the present implementation, and the display apparatus 200 may be the display apparatus according to the present implementation. Since the video player is applied to play a 4K2K image, the video playing system according to the present disclosure may not only display an 8K4K image, but also achieve a low cost video playing system.

In another aspect of the present disclosure, a video playing method is provided, comprising:

converting an inputted image into n preprocessed images with image labels (performed with the image preprocessing unit 110);

converting the n preprocessed images into n sets of first driving signals (performed with the video playing unit 120);

restoring the n sets of first driving signals to the n sets of second driving signals corresponding to the n sub images respectively (performed with the image post-processing unit 220); and outputting the n sets of second driving signals into n input terminals of a display panel respectively, in a synchronous manner (performed with the image post-processing unit 220).

By using the video playing method provided by the implementation, images with a high resolution may be played by hardware having a low configuration (i.e. a video playing unit for playing images with a low resolution), reducing the cost for playing images with a high resolution.

In the present implementation, the method for acquiring preprocessed images is not restricted. Optionally, the step of converting an inputted image into n preprocessed images with image labels may further comprise:

dividing the inputted image into the n sub images; and adding the image labels to the n sub images, to obtain the n preprocessed images.

Optionally, in order to reduce the changes for the sub images as far as possible, or to reduce the computing amounts or to improve the computing speed, the step of adding the image labels to the n sub images may comprise: converting grey scale levels of A pixels on a first row of each sub image into a preset grey scale level value and then forming an image label, to obtain the preprocessed image, and the preset grey scale values corresponding to A pixels of different sub images are different, and A is an integer greater than 1.

Optionally, in order to facilitate the identifying, the image label is formed by converting first A pixels of each sub image As one optional embodiment, the video playing method according to the present implementation may be applied to play 8K4K images. In other words, the inputted images have a resolution of 7680×4320, and A is 8 and n is 4.

Accordingly, the code for the grey scale level value for the image label of a first preprocessed image is 10100001.

Accordingly, the code for the grey scale level value for the image label of a second preprocessed image is 10100010.

Accordingly, the code for the grey scale level value for the image label of a third preprocessed image is 10100011.

Accordingly, the code for the grey scale level value for the image label of a fourth preprocessed image is as 10100100.

For the code for the grey scale level value, 1 means that the grey scale level value is 255, and 0 means that the grey scale level value is 0.

Optionally, in order to facilitate a continuity of the n preprocessed images, when the resolution of the input images is M×N, the step of dividing the inputted image into n sub images may comprise:

comparing the row number i of the inputted pixel (i, j) with M/2; and comparing the column number j of the inputted pixel (i, j) with N/2.

Further, the sub image storage sub unit is configured to store pixels within $1 \leq j \leq N/2$ and $1 \leq i \leq M/2$ into a first sub image; store pixels within $1 \leq j \leq N/2$ and $i > M/2$ into a second sub image, store pixels within $j > N/2$ and $1 \leq i \leq M/2$ into a third sub image, and store pixels within $j > N/2$ and $i > M/2$ into a fourth sub image.

Optionally, in order to enhance the fluency of the video displayed by the display panel so as to improving a user experience, the step of outputting the n sets of second driving signals into n input terminals of a display panel respectively in a synchronous manner may comprise:

duplicating B copies of respective set of the second driving signal; and outputting the n sets of the second driving signals each having B copies into respective input terminals of the display panel in a synchronous manner.

According to the implementation, the inputted image can be inputted at a low frequency, and the outputted image may be displayed at a high frequency. Thus, the video playing method according to the present implementation may have a reduced power consumption.

When the frequency of the inputted image is 15 Hz, B may be 4, which will lead to a display frequency of 60 Hz.

FIG. 6 is a flow char for the video playing method when n is 4 and the inputted image is an 8K4K image, according to the present implementation.

As shown in FIG. 6, optionally, the video playing method may comprise:

dividing the inputted 8K4K image into a sub image 1, a sub image 2, a sub image 3 and a sub image 4;

adding the image labels to the sub image 1, the sub image 2, the sub image 3 and the sub image 4, so as to obtain a preprocessed image 1', a preprocessed image 2', a preprocessed image 3' and a preprocessed image 4';

converting the 4 preprocessed images into 4 sets of first driving signals by using a video playing unit;

selecting, by 4 frame selecting sub units, a first driving signal corresponding to respective frame selecting sub unit respectively;

removing a signal corresponding to respective image label from the 4 sets of first driving signals respectively, so as to obtain 4 sets of second driving signals (including a second driving signal 1", a second driving signal 2", a second driving signal 3" and a second driving signal 4");

duplicating 4 copies of each set of second driving signal, and then outputting each copy of the duplicated second driving signal to respective DDR3 storage unit correspondingly; and outputting each set of second driving signal to a corresponding input terminal of the display panel.

It should be appreciated that in FIG. 6, V×1 represents for a V-by-One port, and 60 P represents for 60 Hz. When the inputted 8K4K image is 15 Hz, it is converted into four preprocessed images firstly. After duplicating four copies of respective second driving signals, the frequency of four preprocessed images displayed in respective areas of the display panel is still 60 Hz.

Thus, according to the present application, the resolution of the preprocessed images may be lower than the resolution of the inputted image. However, the video playing unit may convert the n preprocessed images into n sets of first driving signals. Therefore, the video playing unit may be a video playing unit for playing images with a low resolution. Furthermore, the image preprocessing unit can be integrated with the video playing unit, such that the whole video player has a low cost.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Obviously, it will be understood by those skilled in the art that various changes in form and details may be made therein without departing from the spirit and scope of the present disclosure as restricted by the appended claims and their equivalents.

We claim:

1. A video player, comprising a processor configured to:

receive an inputted image from a display source, and to preprocess the inputted image into n preprocessed images, wherein the processor is further configured to convert the n preprocessed images into n sets of first driving signals for driving a display panel, and to output the n sets of first driving signals via n output terminals for displaying, wherein n is an integer greater than 1, and the n preprocessed images are associated with the n output terminals in a preset manner; and wherein the processor is further configured to divide the image inputted into n sub images, convert grey scale levels of A pixels on a first row of each of the n sub images into a preset grey scale level value to form an image label for a respective sub image of the n sub images, and the preset grey scale level value corresponding to A pixels of different sub images are different, wherein A is an integer greater than 1; and wherein the processor is further configured to label the n sub images by adding the image label to the respective sub image so as to obtain the n preprocessed images with image labels.

2. The video player of claim 1, wherein the image label is formed by converting first A pixels of each sub image, wherein A is 8 and n is 4, wherein:

a code for the grey scale level value for the image label of a first preprocessed image is 10100001;

a code for the grey scale level value for the image label of a second preprocessed image is 10100010;

a code for the grey scale level value for the image label of a third preprocessed image is 10100011; and a code for the grey scale level value for the image label of a fourth preprocessed image is 10100100.

3. The video player of claim 1, wherein a resolution of the inputted image is M×N, wherein M and N are both positive evens, and wherein the processor is further configured to compare a row number i of the inputted pixel (i, j) with M/2, compare the column number j of the inputted pixel (i, j) with N/2, store pixels within $1<j \leq N/2$ and $1<i \leq M/2$ into a first sub image; store pixels within $1<j \leq N/2$ and $i>M/2$ into a second sub image, store pixels within $j>N/2$ and $1<i \leq M/2$ into a third sub image, and store pixels within $j>N/2$ and $i>M/2$ into a fourth sub image.

4. The video player of claim 3, wherein M is 7680 and N is 4320.

5. A display apparatus, comprising a display panel including n input terminals, the display panel being divided into n parts corresponding to the n input terminals respectively, the display apparatus further comprises an image post-processing unit having n input terminals and n output terminals, wherein the n input terminals of the image post-processing unit are connected to the n output terminals of the video player of claim 1 respectively, the n output terminals of the image post-processing unit are connected to the n input terminals of the display panel respectively;

wherein the image post-processing unit is configured to convert the n sets of first driving signals corresponding to the n preprocessed images into n sets of second driving signals, and output the n sets of second driving signals into the n input terminals of the display panel respectively in a synchronous manner such that the display panel displays an image being consistent with the inputted image.

6. The display apparatus of claim 5, wherein each of the preprocessed images contains an image label, wherein the image post-processing unit is further configured to select a first driving signal corresponding to the output terminal of the image post-processing unit according to the image label, and remove a signal corresponding to the image label from the received first driving signal so as to obtain a second driving signal.

7. The display apparatus of claim 6, wherein the preprocessed images are formed by dividing the inputted image into n sub images and then converting the grey scale levels of A pixels of on a first row of each sub image into a preset grey scale level value, wherein the image label is formed by the A pixels having a preset grey scale level;

wherein the image post-processing unit is further configured to restore a signal corresponding to the image label in each of the n sets of first driving signals to a signal corresponding to the A pixels on a corresponding sub image, so as to obtain a second driving signal corresponding to the corresponding sub image.

8. The display apparatus of claim 7, wherein the image post-processing unit is further configured to duplicate B copies of the second driving signal inputted.

9. The display apparatus of claim 8, wherein a frequency of the inputted image is 15 Hz, and B is 4.

10. The display apparatus of claim 5, wherein the output terminals of the image post-processing unit are V-by-One ports.

11. A video playing system, comprising:

a display apparatus, comprising a display panel including n input terminals, the display panel being divided into n parts corresponding to the n input terminals respectively, the display apparatus further comprises an image post-processing unit having n input terminals and n output terminals, wherein the n input terminals of the image post-processing unit are connected to the n output terminals of the video player of claim 1 respectively, the n output terminals of the image post-processing unit are connected to the n input terminals of the display panel respectively;

wherein the image post-processing unit is configured to convert the n sets of first driving signals corresponding to the n preprocessed images into n sets of second driving signals, and output the n sets of second driving signals into the n input terminals of the display panel respectively in a synchronous manner such that the display panel displays an image being consistent with the inputted image.

12. A video playing method, comprising:

converting an inputted image into n preprocessed images with image labels by dividing the inputted image into n sub images and adding the image labels to the n sub images, to obtain the n preprocessed images;

converting the n preprocessed images into n sets of first driving signals;

restoring the n sets of first driving signals to the n sets of second driving signals corresponding to the n sub images respectively; and outputting the n sets of second driving signals into n input terminals of a display panel respectively, in a synchronous manner; and wherein adding the image labels to the n sub images comprises:

converting grey scale levels of A pixels on a first row of each sub image into a preset grey scale level value;

forming an image label for a respective sub image of the n sub images, to obtain the preprocessed image, wherein the preset grey scale values corresponding to A pixels of different sub images are different, wherein A is an integer greater than 1; and labeling the n sub images by adding the image label to the respective sub image so as to obtain the n preprocessed images with the image labels.

13. The video playing method of claim 12, wherein the image label is formed by converting first A pixels of each sub image, wherein A is 8 and n is 4, wherein:

a code for the grey scale level value for the image label of a first preprocessed image is 10100001;

a code for the grey scale level value for the image label of a second preprocessed image is 10100010;

a code for the grey scale level value for the image label of a third preprocessed image is 10100011; and a code for the grey scale level value for the image label of a fourth preprocessed image is 10100100.

14. The video playing method of claim 12, wherein a resolution of the inputted image is M×N, wherein dividing the inputted image into the n sub images further comprises:

comparing the row number i of the inputted pixel (i, j) with M/2;

comparing the column number j of the inputted pixel (i, j) with N/2;

storing pixels within $1 \le j \le N/2$ and $1 \le i \le M/2$ into a first sub image;

storing pixels within $1 \le j \le N/2$ and $i > M/2$ into a second sub image;

storing pixels within $j > N/2$ and $1 \le i \le M/2$ into a third sub image; and storing pixels within $j > N/2$ and $i > M/2$ into a fourth sub image;

wherein M is 7680 and N is 4320.

15. The video playing method of claim 12, wherein outputting the n sets of second driving signals into n input terminals of a display panel respectively in a synchronous manner comprises:

duplicating B copies of respective set of the second driving signal; and outputting the n sets of the second driving signals each having B copies into respective input terminals of the display panel in a synchronous manner.

16. The video playing method of claim 15, wherein a frequency of the inputted image is 15 Hz, and B is 4.

\* \* \* \* \*